United States Patent [19]

Herman

[11] Patent Number: 5,522,281
[45] Date of Patent: Jun. 4, 1996

[54] ADJUSTABLE TIE-ROD ASSEMBLY FOR A MOTOR VEHICLE

[75] Inventor: Slawomir J. Herman, Rochester, Mich.

[73] Assignee: Chrysler Corporation, Auburn Hills, Mich.

[21] Appl. No.: 331,408

[22] Filed: Oct. 31, 1994

[51] Int. Cl.⁶ .................................................. G05G 1/21
[52] U.S. Cl. ........................ 74/586; 74/579 R; 384/276
[58] Field of Search .................................. 74/579 R, 585, 74/586, 587, 588; 280/95.1, 661; 384/276, 296

[56] References Cited

U.S. PATENT DOCUMENTS

| 2,584,687 | 2/1952 | Fidler | 74/586 |
| 2,648,997 | 8/1953 | Sawyer | 74/586 |
| 3,319,488 | 5/1967 | Bentley et al. | 74/586 |
| 3,439,946 | 4/1969 | Gottschald et al. | 74/586 |
| 4,012,967 | 3/1977 | Warren | 74/586 |

Primary Examiner—Charles A. Marmor
Assistant Examiner—Chong H. Kim
Attorney, Agent, or Firm—Edward A. Craig

[57] ABSTRACT

An adjustable tie-rod assembly for an automotive vehicle has inner and outer rod end sections, and an intermediate rod section. The intermediate and inner rod end sections are rotatably connected together. The intermediate rod section is threaded on the outer rod end section and a jam nut maintains this connection. A stud projects laterally outwardly from the outer rod end section for connection to a steering arm.

5 Claims, 2 Drawing Sheets

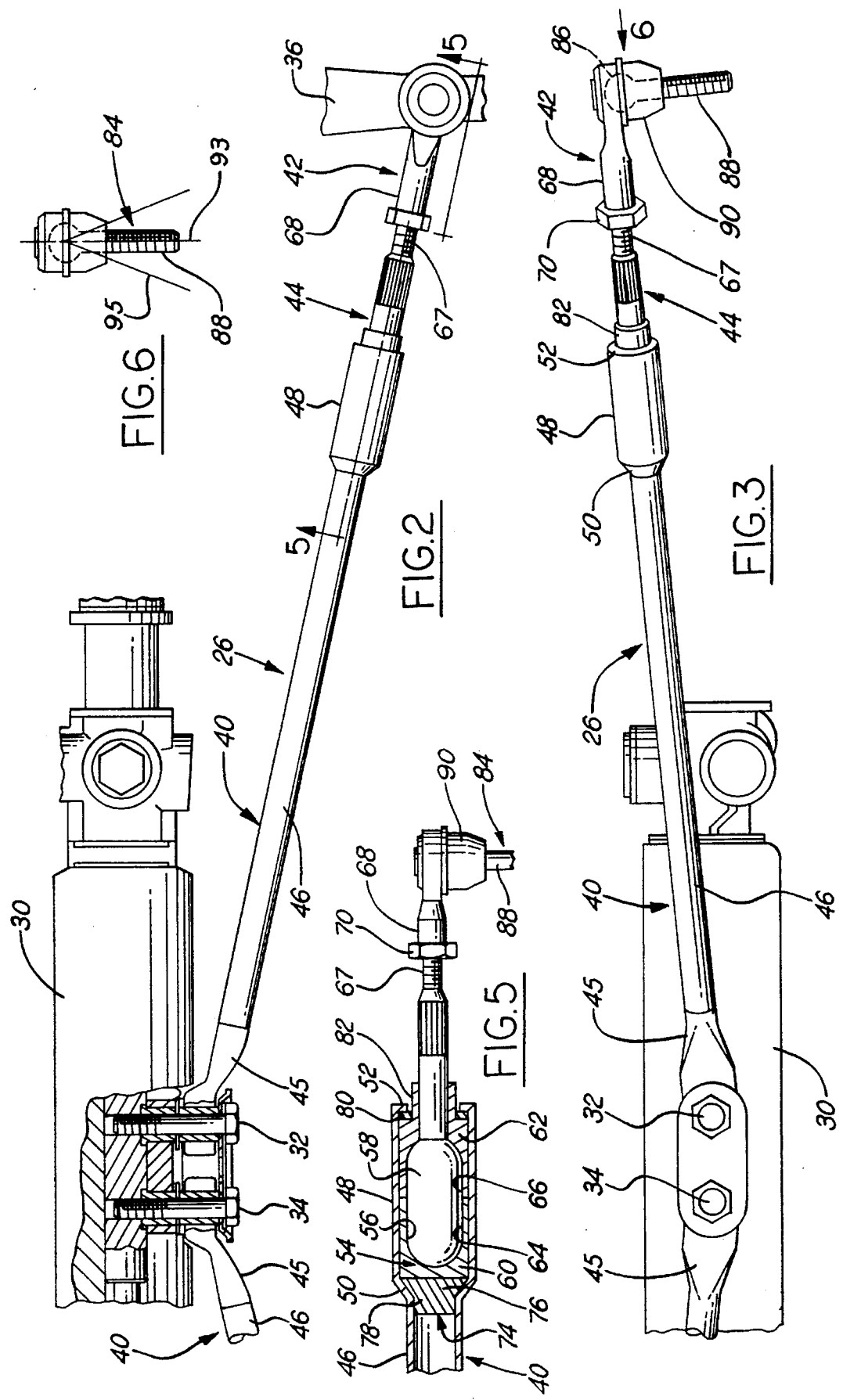

5,522,281

1

ADJUSTABLE TIE-ROD ASSEMBLY FOR A MOTOR VEHICLE

FIELD OF THE INVENTION

This invention relates generally to an adjustable tie-rod assembly for a motor vehicle.

BACKGROUND AND SUMMARY OF THE INVENTION

Proper front wheel alignment requires the correct setting of all of the interrelated suspension angles affecting the running and steering of the front wheels of a vehicle. Among the factors involved in front wheel alignment is toe-in. Toe-in is measured in degrees or inches. Toe-in is the difference in the distance between the front edges and the distance between the rear edges of the tires.

Correct toe-in is maintained by adjustable tie-rods. One such tie-rod construction in service has inner and outer tie-rod sections connected by an adjustment sleeve. The adjustment sleeve is threaded to both tie-rod sections. Jam nuts on the threaded ends of the tie-rod sections are tightened and torqued against the sleeve to maintain the adjustment. A stud on the outer tie-rod section must be perpendicular to the tie-rod so that the stud will be in a neutral or "0" position when it is attached to the steering arm in order to be at the proper angle to accommodate movement of the vehicle suspension. To make an adjustment requires four tools, namely, a wrench to turn the sleeve for adjustment purposes, two wrenches to apply torque to the jam nuts for tightening, and a tool to hold the stud so that the end of the outer tie-rod section is in proper position with the stud perpendicular to the axis of the tie-rod. The jam nuts in this construction can loosen and thereby destroy the adjustment.

The tie-rod assembly of the present invention is easier to adjust, requires fewer tools to accomplish the adjustment, and is not prone to loosening because the two tie-rod end sections are free to turn relative to one another. Since the parts can rotate, the problem of locking them together to make sure there is the proper perpendicular relationship is avoided because the tie-rod will be self-adjusting during use. In other words, it will seek a position where there is no torsional load. The present invention has the further advantage of eliminating one of the jam nuts.

In accordance with the specific embodiment about to be described, there are inner, outer and intermediate rod sections. The intermediate and inner rod sections are rotatably connected together. The intermediate rod section is threaded on the outer rod section and a jam nut maintains this connection.

One of the objects of this invention is to provide a tie-rod assembly having the foregoing features.

Another object is to provide a tie-rod assembly which is composed of a relatively few simple parts, is relatively inexpensive, is easy to manufacture, assemble and adjust, can be adjusted with the use of fewer tools and is not prone to loosen or require frequent readjustment.

Other objects features and advantages of the invention will become more apparent as the following description proceeds, especially when considered together with the accompanying claims and drawings.

2

FIG. 2 is an enlarged fragmentary view as seen from above and with parts in section, showing one of the tie-rod assemblies.

FIG. 3 is a view as seen from the rear, showing the structure of FIG. 2.

Figure 4:
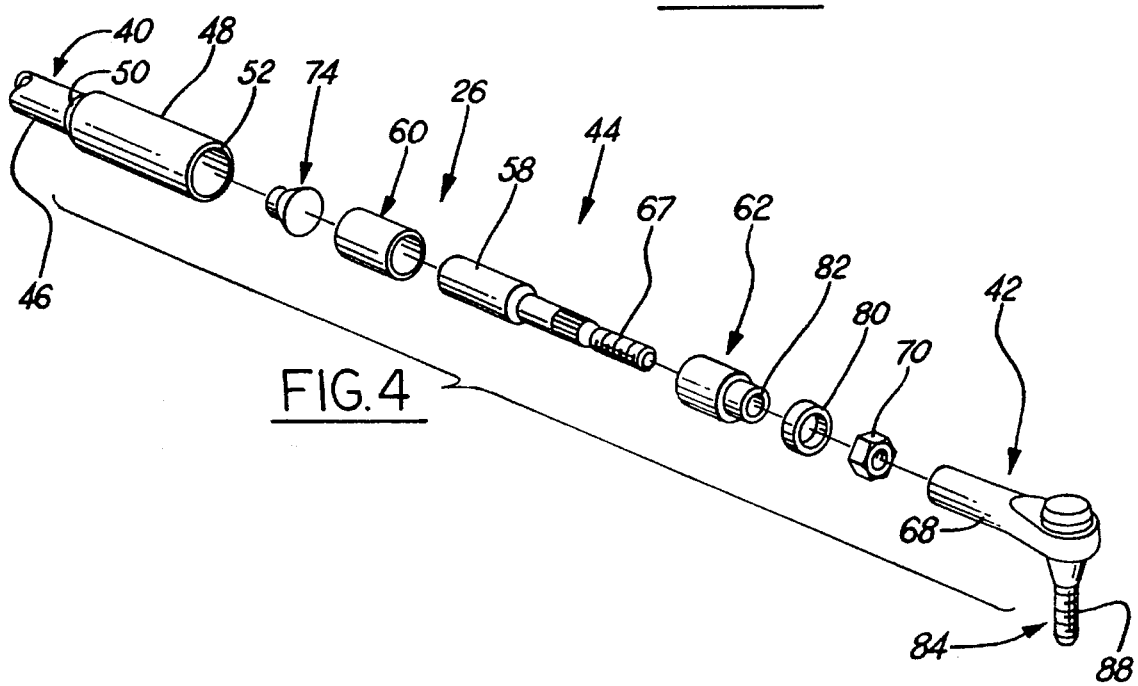

FIG. 4 is an exploded view in perspective showing the parts of one of the tie-rod assemblies.

FIG. 5 is a fragmentary sectional view taken on the line 5—5 in FIG. 2.

FIG. 6 is a view looking in the direction of the arrow 6 in FIG. 3.

DETAILED DESCRIPTION

Figure 1:
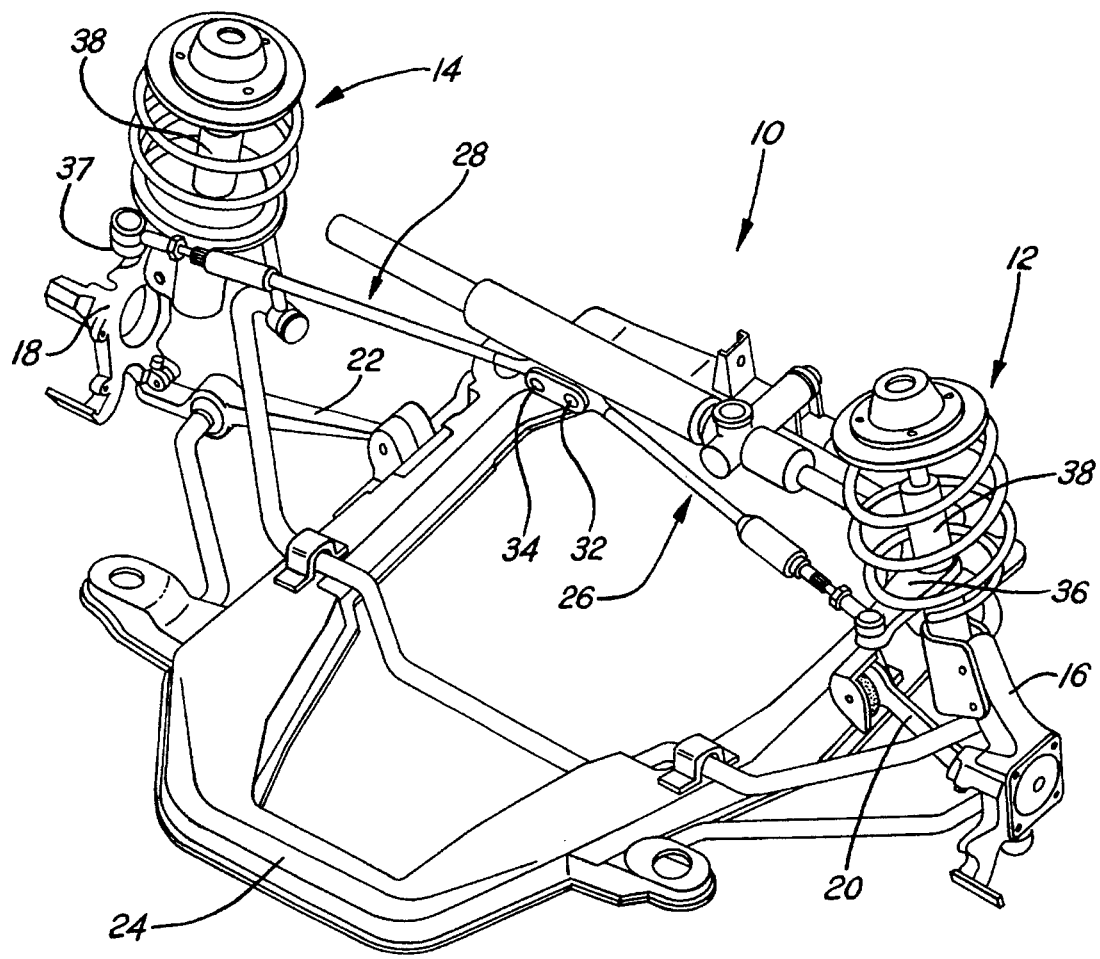
FIG. 1 is a perspective view of a portion of the front suspension of an automobile, having tie-rod assemblies constructed in accordance with the invention.

Referring now more particularly to the drawings, and especially to FIGS. 1 and 2, the front suspension 10 of an automobile is shown having strut assemblies 12 and 14, steering knuckles 16 and 18 secured to the respective strut assemblies 12 and 14, and lower control arms 20 and 22 pivoted to the respective steering knuckles 16 and 18 and also to the front cradle 24. Tie-rod assemblies 26 and 28 each have their inner ends pivoted to the steering gear 30 by pivots 32 and 34. The outer ends are pivoted to steering arms 36 and 37 extending outwardly from the struts 38 of the strut assemblies. The tie-rod assemblies 26 and 28 are identical and therefore only one will be described.

Tie-rod assembly 26 has an elongated inner tie-rod end section 40, an elongated outer tie-rod end section 42, and an elongated intermediate tie-rod section 44. The tie-rod sections 40, 42 and 44 are axially aligned.

The inner rod end section 40 is an elongated tubular member which is straight throughout its length and has a slightly curved extension 45 at the inner end which is pivoted to the steering gear. The main body portion 46 of the inner rod end section 40 is tubular and is axially aligned with and connects into the enlarged tubular outer end portion 48. The tubular portions 46 and 48 are connected by a frusto-conical portion 50. The enlarged outer end portion 48 is cylindrical, that is, it is of uniform circular cross section throughout its length. The outer end of the enlarged outer end portion 48 is open and a radially inwardly extending annular flange 52 extends part-way across the open outer end.

A bushing 54 is disposed in the enlarged cylindrical outer end portion 48 of the inner rod end portion 40, retained therein by the flange 52 which is turned radially inwardly after the bushing is inserted. The radially outer surface of bushing 54 is cylindrical and fits closely within the cylindrical radially inner surface of the outer end of portion 48. The bushing 54 has a hollow interior 56 which is cylindrical, that is, it is of uniform circular cross-section throughout its length except for the hemispherical ends. The hollow interior 56 is axially elongated and has a central axis which is aligned with the axes of the inner and outer rod end sections 40 and 42 and the intermediate rod section 44.

The intermediate rod section 44 has an enlarged bearing 58 at the inner end which is rotatably received in the cylindrical, hollow interior 56 of the bushing 54. The bearing is axially elongated and of the same cylindrical form as the cylindrical, hollow interior 56 of the bushing and is rotatable in the bushing.

The bushing 54 is made up of juxtaposed axially aligned first and second bushing parts 60 and 62. The bushing part 60 is cup-shaped, having a radially inner annular sidewall 64 and an open end. The bushing part 62 is tubular and has a radially inner annular sidewall 66 and open ends. One end of the bushing part 62 abuts the open end of the bushing part 60. The radially inner sidewalls 64 and 66 of the bushing parts 60 and 62 cooperate in defining the hollow interior 56 of the bushing.

The outer end portion 67 of the intermediate section 44 is externally threaded. The inner end portion 68 of the outer rod end section 42 is tubular and internally threaded. The externally threaded outer end portion 67 of the intermediate rod section 44 is threaded into the internally threaded inner end portion 68 of the outer rod end section 42. A jam nut 70 threaded on the outer end portion 67 of the intermediate rod section 44 is torqued into tight bearing engagement with the inner end portion 68 of the outer rod end section 42 to prevent relative rotation between the outer end section 42 and the intermediate rod section 44.

An insert 74 in the inner rod end section 40 has a frusto-conical end portion 76 with its frusto-conical surface seated on the frusto-conical portion 50 of the tubular inner rod end section 40. The insert 74 abuts the closed end of the bushing part 60 and has an integral plug 78 which fits within the main body portion 46 of the inner rod end section 40.

A washer 80 in the hollow interior of the enlarged tubular outer end portion 48 of the inner rod end section 40 is disposed between the end of the second bushing part 62 and the flange 52. The second bushing part 62 has an integral axial tubular extension 82 of reduced diameter which projects through the washer 80 and through the annular flange 52 and is sleeved over the intermediate rod section 44.

A stud 84 extends laterally outwardly from the outer end portion of the outer rod end section 42. Stud 84 has a spherical head 86 which has a swivel fit in a socket within outer rod end section 42. The shank 88 of the stud is normally perpendicular to the rod end section 42 and is surrounded by a rubber grommet 90. The shank 88 of stud 84 is threaded and adapted to threadedly engage the outer end of the steering arm 36.

As previously mentioned, a centerline 93 of the shank 88 of the stud 84 should assume a "0" at rest position as shown in FIG. 6. Lines 95 and 97 illustrate the range of travel of the stud 84 which occurs as a consequence of movement of the vehicle suspension. Centerline 93 should bisect the angle defined by these lines when the vehicle is not in use. The opposing suspension forces are in equilibrium when the stud 92 assumes the position shown. The tie rod is free to rotate to establish this position. In the past this has not been true because of the fixed nature of the jam nut securing system which has been used.

The tie-rod assembly of this invention is not prone to loosening or to require frequent re-adjustment because of the free relative turning movement provided between the inner rod section 40 and the intermediate rod section 42. As such, it is self-adjusting in use. The parts can rotate freely and therefore do not have to be locked together in any particular relationship. The parts will seek a position where there is no torsional load.

What is claimed is:

1. An adjustable tie-rod assembly for an automotive vehicle comprising, an elongated tubular inner rod end section, said tubular inner rod end section having a tubular main body portion connecting into an enlarged tubular outer end portion terminating in an open outer end, a bushing within said tubular outer end portion and having a hollow interior, an elongated intermediate rod section having a first end portion and a second end portion, said intermediate rod section having an enlarged bearing on said first end portion thereof rotatably received in the hollow interior of said bushing, an annular flange extending radially inwardly from the open outer end of said enlarged tubular outer end portion of said inner rod end section to retain said bushing therein, an elongated outer rod end section having a first end portion and a second end portion, means securing said first end portion of said outer rod end section to said second end portion of said intermediate rod section, said inner and outer rod end sections and said intermediate rod section having aligned axes, the hollow interior of said bushing being cylindrical and axially elongated and having a central axis aligned with said central axes, said bearing being axially elongated and of the same cylindrical form as the cylindrical, hollow interior of said bushing and rotatably received therein, said first end portion of said outer rod end being tubular and receiving said second portion of said intermediate rod section, said means securing said first end portion of said outer rod end section to said second end portion of said intermediate rod section comprising internal threads on said first end portion on said outer rod end section and external threads on said second end portion of said intermediate rod section which are threadedly engaged with one another, a jam nut threaded on said second end portion of said intermediate rod section and advanced into jamming contact with the first end portion of said outer rod end section, and a stud projecting laterally outwardly from said second end portion of said outer rod end section.

2. An adjustable tie-rod assembly according to claim 1, wherein said bushing comprises juxtaposed axially aligned, first and second bushing parts, said first bushing part being cup-shaped having a radially inner annular side wall and an open end, said second bushing part being tubular having a radially inner annular side wall and open ends with one such end abutting the open end of said first bushing part, said radially inner annular side walls of said first and second bushing parts cooperating to define said cylindrical hollow interior of said bushing.

3. An adjustable tie-rod assembly according to claim 2 wherein said tubular inner rod end section has a frusto-conical wall which connects said main body portion of said tubular inner rod end section to the enlarged tubular outer end portion thereof, and further including an insert in said tubular inner rod end section abutting said first bushing part and having a frusto-conical surface seated on said frusto-conical wall and also having an integral plug extending into and fitting within said main body portion.

4. An adjustable tie-rod assembly according to claim 3, and further including a washer in said enlarged tubular outer end portion of said inner rod end section between the second bushing part and said annular flange, said second bushing part having a tubular axial extension of reduced diameter projecting through said washer and annular flange and sleeved over said intermediate rod section.

5. An adjustable tie-rod assembly for an automotive vehicle comprising:

an elongated inner rod end section, said inner rod end section having a tubular outer end portion terminating in an open outer end, a bushing within said tubular outer end portion and having a hollow interior, an elongated intermediate rod section having a first end portion and a second end portion, said intermediate rod section having a bearing on said first end portion thereof rotatably received in the hollow interior of said bushing, an annular flange extending radially inwardly from the open outer end of said tubular outer end portion of said inner rod end section to retain said bushing therein, an elongated outer rod end section having a first end portion and a second end portion, means securing said first end portion of said outer rod end section to said second end portion of said intermediate rod section, said first end portion of said outer rod end section being tubular and receiving said second portion of said intermediate rod section, said means securing said first end portion of said outer rod end section to said second end portion of said intermediate rod section comprising internal threads on said first end portion of said outer rod end section and external threads on said second end portion of said intermediate rod section which are threadedly engaged with one another, a jam nut threaded on said second end portion of said intermediate rod section and advanced into jamming contact with the first end portion of said outer rod end section, and a stud projecting laterally outwardly from said second end portion of said outer rod end section.

* * * * *